(12) United States Patent
Molin et al.

(10) Patent No.: US 12,478,039 B2
(45) Date of Patent: Nov. 25, 2025

(54) MULTITASKING MOBILE ROBOT USED TO DISTRIBUTE PRODUCTS AND SUPPLIES AND TO PERFORM LIVESTOCK REARING HANDLING ACTIVITIES

(71) Applicants: Giovani Molin, Caxias do Sul (BR); Geferson Ronei Buzini, Caxias do Sul (BR); João Carlos Molin, Caxias do Sul (BR)

(72) Inventors: Giovani Molin, Caxias do Sul (BR); Geferson Ronei Buzini, Caxias do Sul (BR); João Carlos Molin, Caxias do Sul (BR)

(*) Notice: Subject to any disclaimer, the term of this patent is extended or adjusted under 35 U.S.C. 154(b) by 0 days.

(21) Appl. No.: 18/271,818

(22) PCT Filed: Oct. 21, 2021

(86) PCT No.: PCT/BR2021/050464
§ 371 (c)(1),
(2) Date: Jul. 11, 2023

(87) PCT Pub. No.: WO2022/150892
PCT Pub. Date: Jul. 21, 2022

(65) Prior Publication Data
US 2024/0074408 A1    Mar. 7, 2024

(30) Foreign Application Priority Data
Jan. 12, 2021  (BR) .................. BR132021000489-3

(51) Int. Cl.
*A01K 5/02*    (2006.01)

(52) U.S. Cl.
CPC .................... *A01K 5/0266* (2013.01)

(58) Field of Classification Search
CPC .................................... A01K 5/0266
See application file for complete search history.

(56) References Cited

U.S. PATENT DOCUMENTS

| | | | | |
|---|---|---|---|---|
| 3,437,075 | A * | 4/1969 | Hawes, Jr. | A01K 5/0216 119/57.2 |
| 4,002,147 | A * | 1/1977 | Feterl | A01D 87/122 414/458 |
| 4,002,252 | A * | 1/1977 | Beckman, Jr. | A01K 5/0266 414/501 |
| 2001/0055524 | A1* | 12/2001 | Jackson | A01K 5/0266 414/467 |

(Continued)

FOREIGN PATENT DOCUMENTS

| | | | | |
|---|---|---|---|---|
| BE | 902720 A | * | 10/1985 | ............. A01K 29/00 |
| BR | 102018004954 A2 | * | 10/2019 | |

(Continued)

*Primary Examiner* — Peter M Poon
*Assistant Examiner* — Hae Rie Jessica Byun
(74) *Attorney, Agent, or Firm* — LaMorte & Associates P.C.

(57) ABSTRACT

Terrestrial multitasking mobile robot capable of being coupled to said structure and transporting it, through the maneuvering area (Am) and along the operating corridor (Cf) between the various bays (29), providing access to the various implements (1 to 7) arranged in the aerial magazine (Ma) or for coupling to the implements in the terrestrial magazine (Mt) used to distribute products and supplies for livestock rearing.

8 Claims, 12 Drawing Sheets

(56) References Cited

U.S. PATENT DOCUMENTS

| | | | | |
|---|---|---|---|---|
| 2003/0070622 | A1* | 4/2003 | Vaags | A01K 61/80 |
| | | | | 119/51.11 |
| 2004/0245359 | A1* | 12/2004 | Faccia | A01K 5/004 |
| | | | | 241/101.74 |
| 2006/0118054 | A1* | 6/2006 | Rousseau | A01K 1/015 |
| | | | | 119/57.1 |
| 2010/0326363 | A1* | 12/2010 | Van Den Berg | B01F 35/7548 |
| | | | | 119/57.92 |
| 2014/0029375 | A1* | 1/2014 | Liet | A01K 5/00 |
| | | | | 366/280 |
| 2016/0023867 | A1* | 1/2016 | Posthumus | B66C 17/06 |
| | | | | 366/150.1 |
| 2017/0360014 | A1* | 12/2017 | Hall | B65G 1/0492 |
| 2018/0368464 | A1* | 12/2018 | Wise | A01K 5/002 |
| 2021/0100216 | A1* | 4/2021 | De Traversay | A01K 5/0266 |
| 2022/0055517 | A1* | 2/2022 | Ardison | B60P 1/38 |
| 2024/0016086 | A1* | 1/2024 | Van Den Berg | A23N 17/008 |
| 2024/0298865 | A1* | 9/2024 | Jorna | B60L 53/124 |

FOREIGN PATENT DOCUMENTS

| | | | | | |
|---|---|---|---|---|---|
| CN | 108207670 | A | * | 6/2018 | |
| DE | 3326484 | A1 | * | 2/1985 | |
| DE | 19953163 | A1 | * | 5/2001 | A01K 5/004 |
| DE | 102011051833 | B3 | * | 9/2012 | A01K 5/005 |
| DE | 102018100534 | A1 | * | 7/2019 | |
| EP | 2783567 | A2 | * | 10/2014 | A01F 29/005 |
| GB | 2063639 | A | * | 6/1981 | A01K 5/0266 |
| KR | 101334768 | B1 | * | 11/2013 | |
| KR | 102144611 | B1 | * | 8/2020 | |
| NL | 1033988 | C1 | * | 9/2007 | |

* cited by examiner

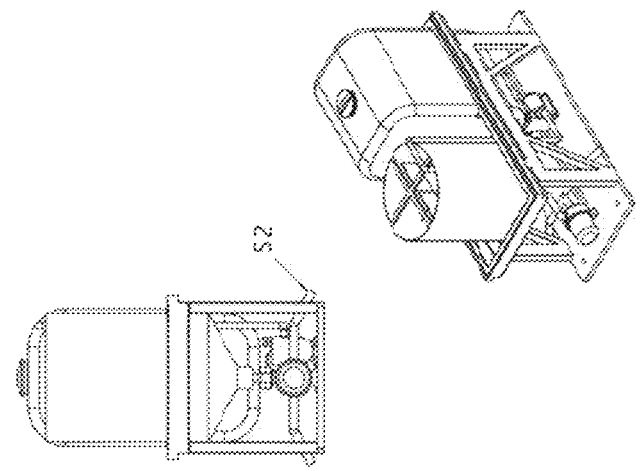
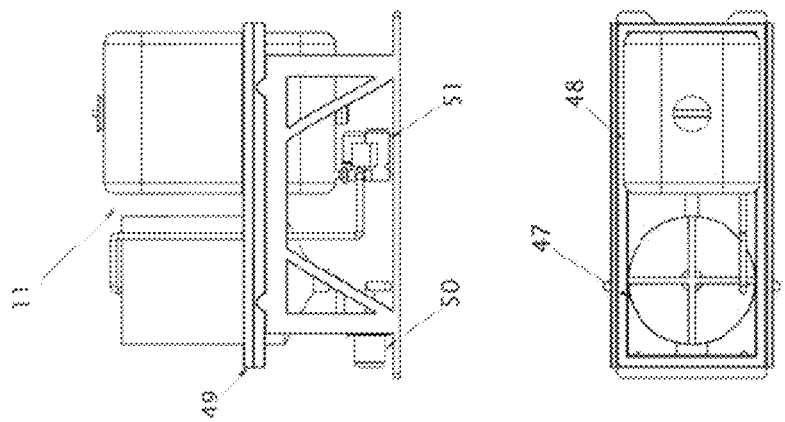
FIG. 12

MULTITASKING MOBILE ROBOT USED TO DISTRIBUTE PRODUCTS AND SUPPLIES AND TO PERFORM LIVESTOCK REARING HANDLING ACTIVITIES

TECHNICAL FIELD

The following descriptive report refers to the Certification of Addition to Brazilian patent BR 1020200216252 and the present invention depicts a multitasking mobile robot with ground movement, used to distribute animal breeding products and supplies, able to use the several implements arranged in one or more magazines.

BACKGROUND OF THE INVENTION

The closest art to the multitasking mobile robot proposed is described in Brazilian document BR 1020200216252, consisting of an animal breeding product and supply distribution system that employs a multitasking mobile robot (1, 1a, 1b, or 1c) able to displace in the X-Y-Z axes by means of rails fixed over the stalls, dispensing the breeding products and supplies to the animals from the magazines (15, 15a, or 15b) positioned next to the stalls. The magazines may contain, for example, one feed dispenser (22), liquid dispenser (23), user operational carrier (24), data collector (26), animal environment sanitizer and air conditioning system (27), overlay bed spreader/picker (28), waste picker (29), liquid feed dispenser (30), liquid diet dispenser (31), and multifunction arm (32).

The implementation of the animal breeding product and supply distribution system employing the multitasking mobile robot described in BR 10 20200216252 involves high costs related to the significant change of the current layout.

In addition, depending on the physical situation of the shed, location in the land, and space available for expansion works, the assembly of the system described in BR 1020200216252 becomes very complex.

DESCRIPTION OF THE INVENTION

Therefore, due to the considerations regarding the state of the art discussed above, one of the purposes of the present certificate of inclusion of the invention proposed, to design a multitasking mobile robot able to collect specific implements as programmed, run the entire extension of one or more sheds to perform the animal management activities scheduled and integrate the management software into the breeding activities required, which include automatic dispensing of different types of mixed or pure feeds, medications, all sorts of liquids, food supplements, according to predefined parameters, as well as perform other essential handling activities, such as administering vaccines, transporting animals, monitoring (room temperature, gas concentrations, humidity, animal weight and temperature, etc.), wash the stalls, spray liquids, etc.

This system allows local or remote real-time management, following up the development of the animals by controlling several parameters (feed quantity, feeding times, weight, temperature, etc.) and by means of periodical breeder/integrator visits, in order to optimize the breeding process and preserve animal welfare, improve the breeder's life quality, and promote a healthy environment.

To understand the multitasking mobile land robot proposed, consider the following concepts and definitions:

Multitasking mobile land robot means autonomous mobile equipment able to run the entire extension of the barn, fill up with the products arranged in one or more magazines in specific locations, take the products to the several stalls, distribute them according to the predefined schedule, and then return to the stopping point.

Structure consists of a "T" shaped truss that is moved by the multitasking mobile land robot and couples to the overhead magazine to transport the implements;

Magazines means storage location of the different implements. These magazines can be configured as an overhead structure or as a low structure;

Implements means equipment accessed by the robot and required to allow performing all animal handling activities. These implements are managed by automation together with software that allows synchronizing the tasks.

Carts means vehicles parked on the overhead magazine, with wheels driven by motors that allow displacement on the "T" structure and positioning over the several stalls.

DESCRIPTION OF THE DRAWINGS

The present certificate of invention is characterized by drawings that depict the multitasking mobile robot used to distribute animal breeding products and supplies to allow fully reproduction by means of appropriate techniques, allowing the characterization of the functionality of the object described.

The descriptive part of the report is based on the figures that express the physical product conceived, with detailed and consecutive numbering to clarify any aspects that may be implied by the representation adopted, in order to clearly define the protection intended.

These figures are merely illustrative and may present variations, as long as not significantly different from the initial proposal.

Figure 1:
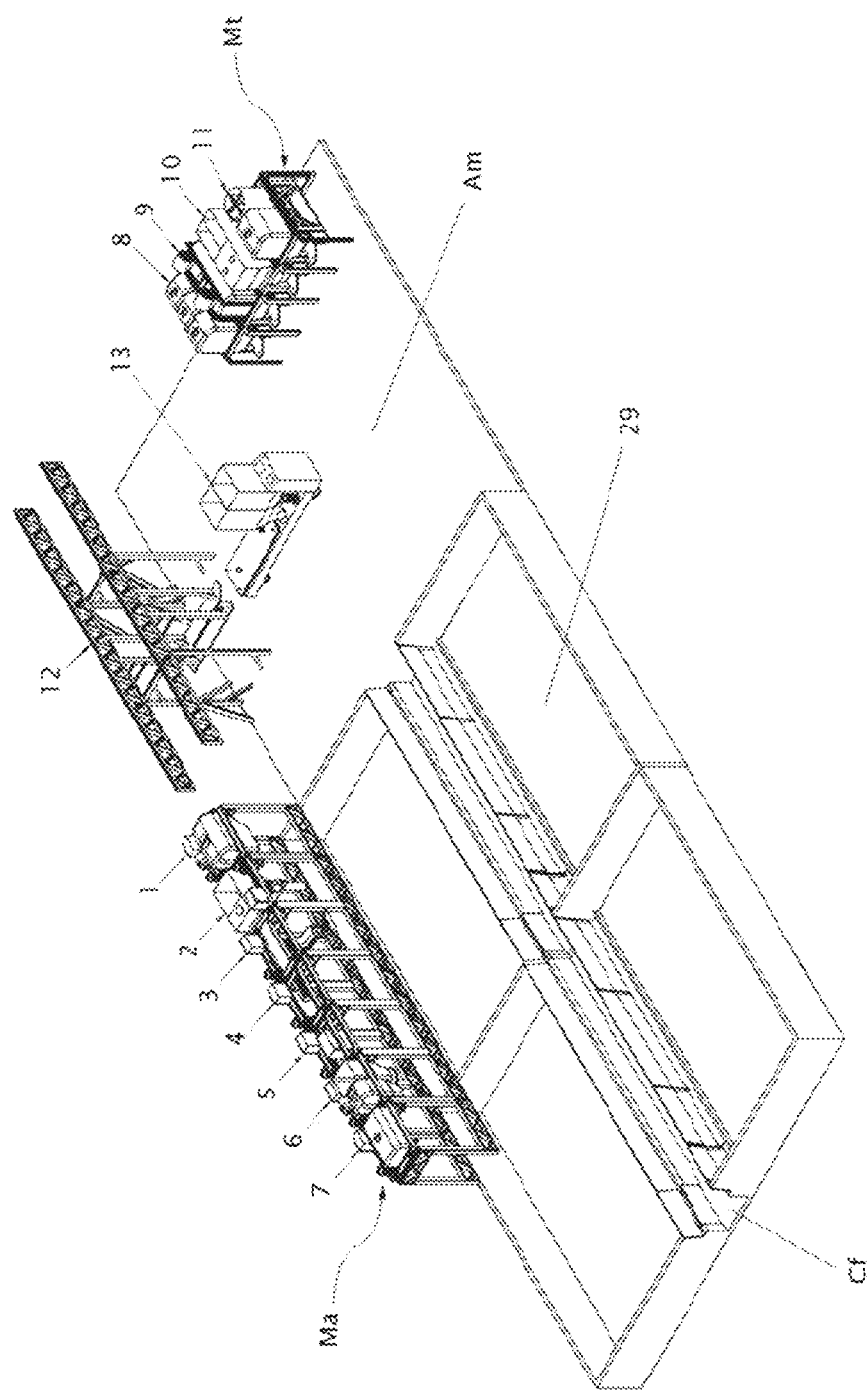
Figure 2:
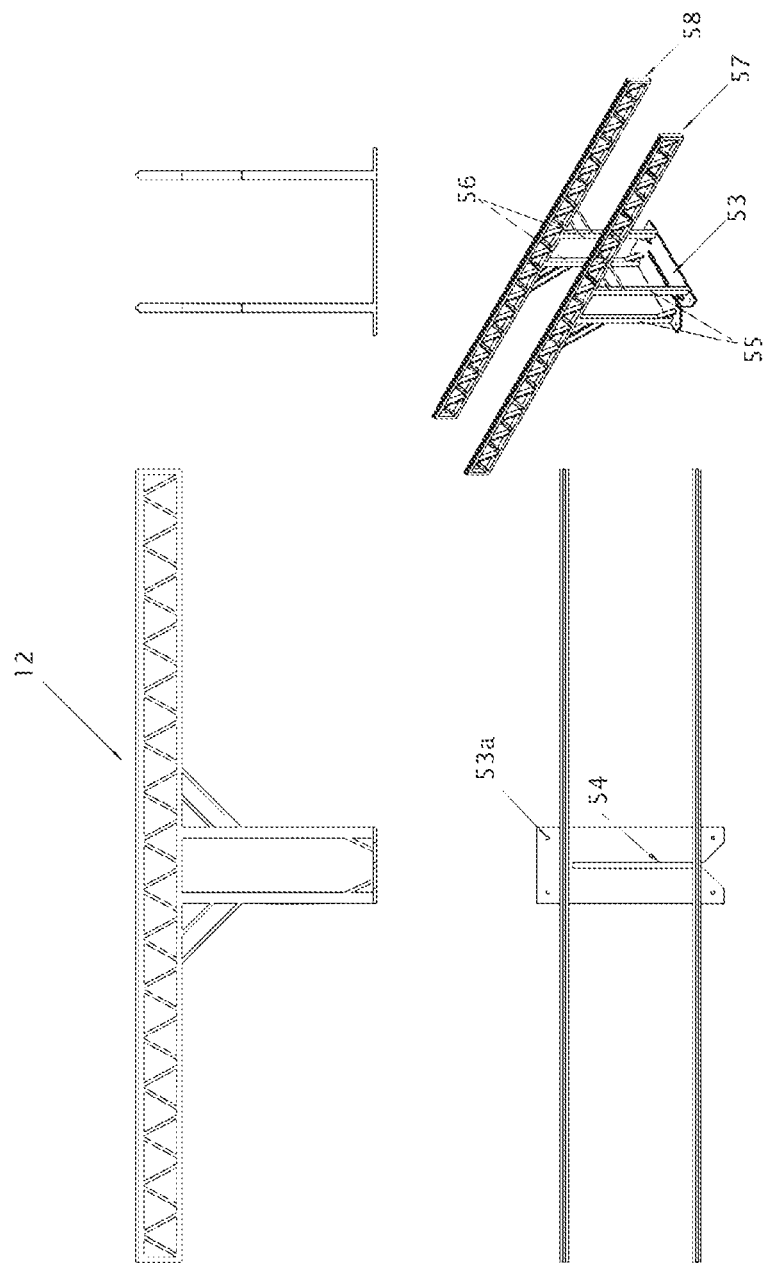
Figure 3:
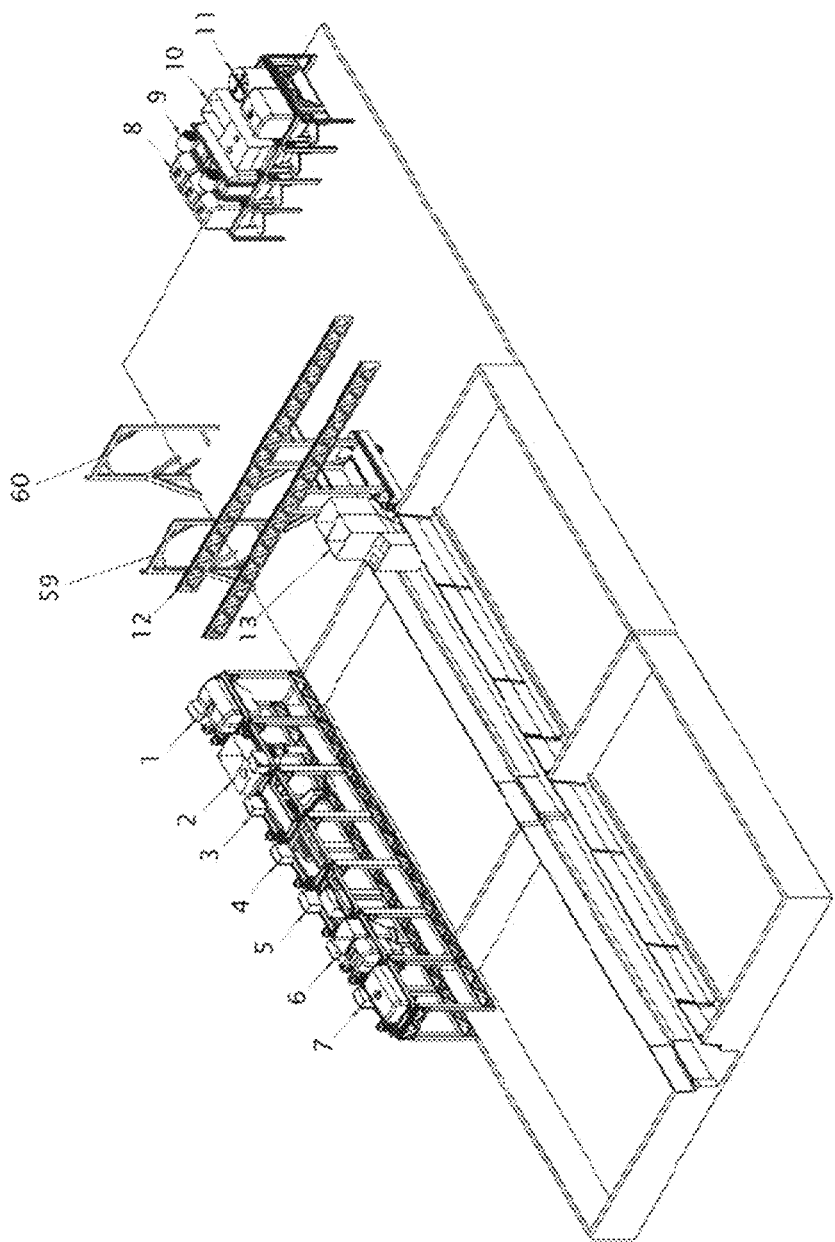
Figure 4:
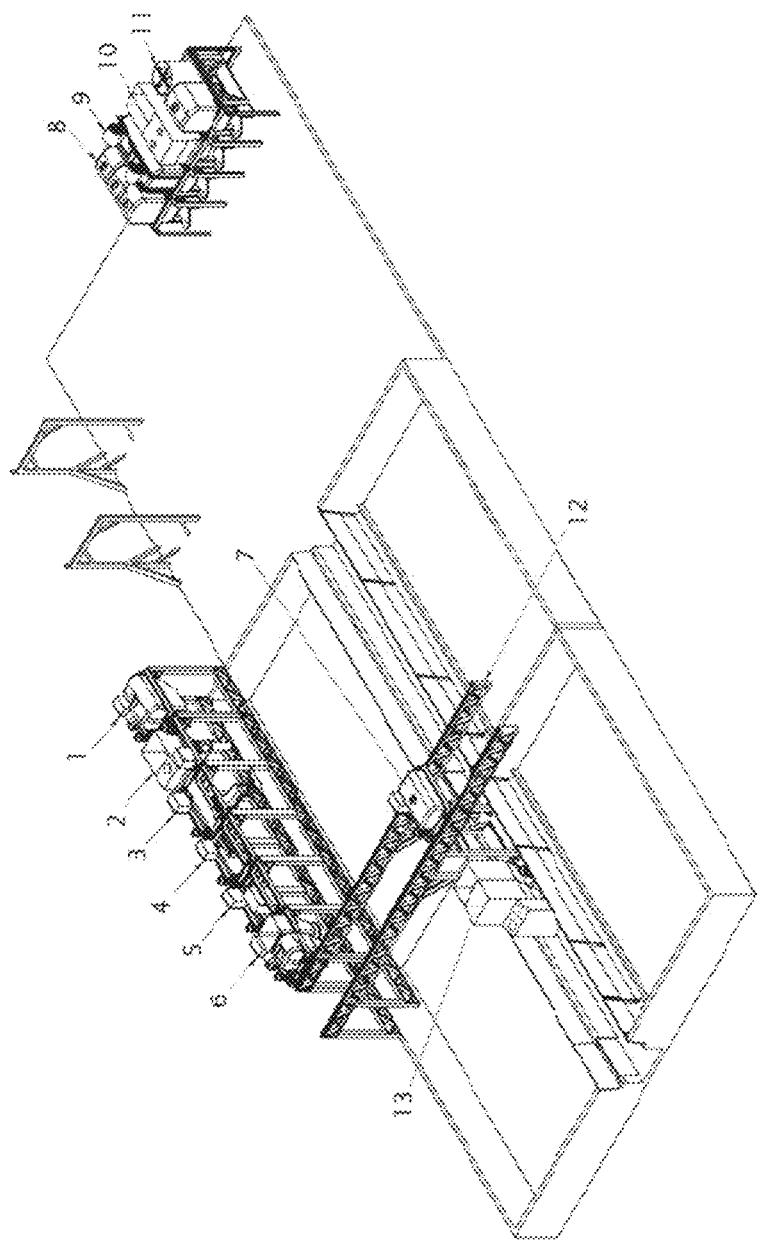
Figure 5:
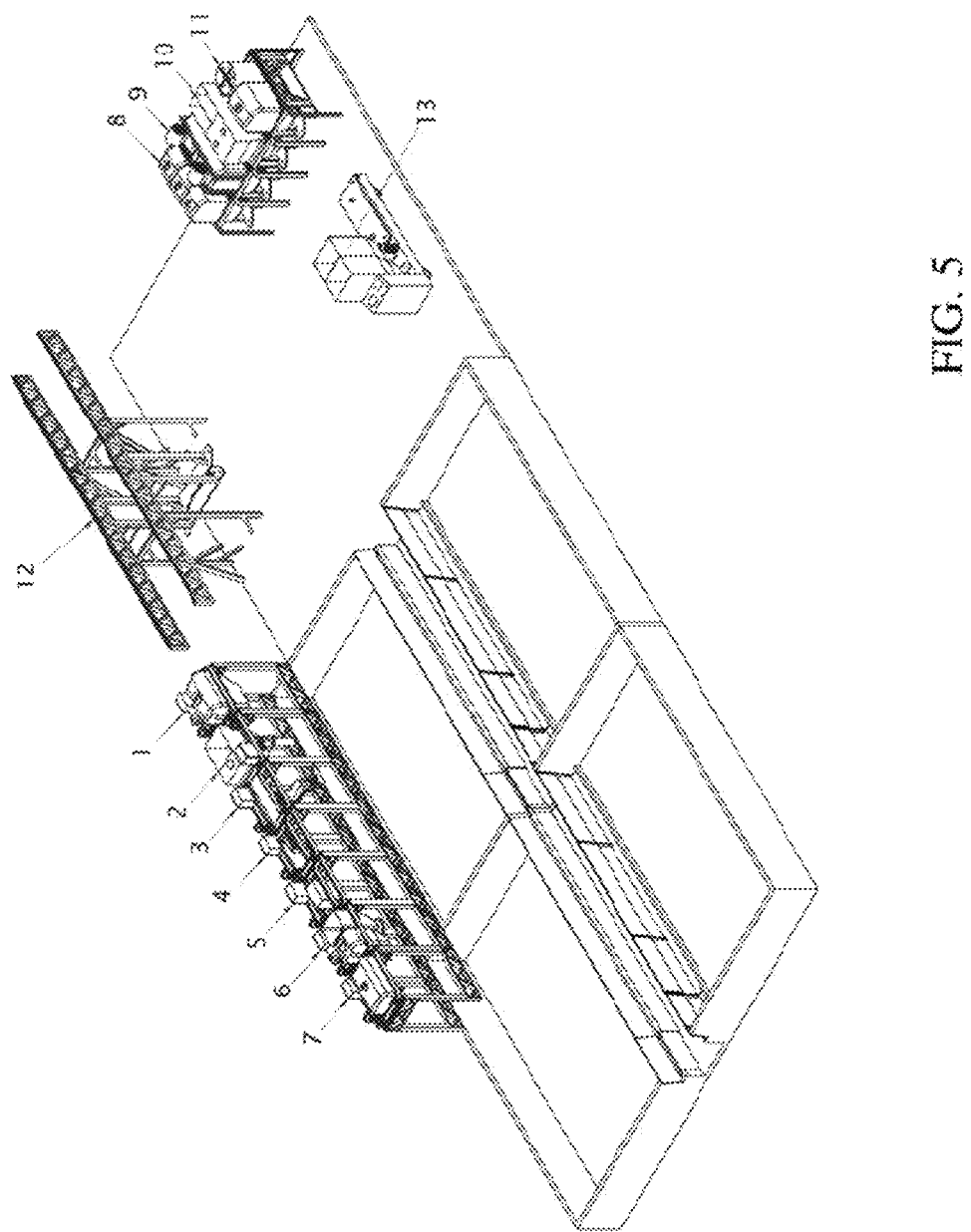
Figure 6:
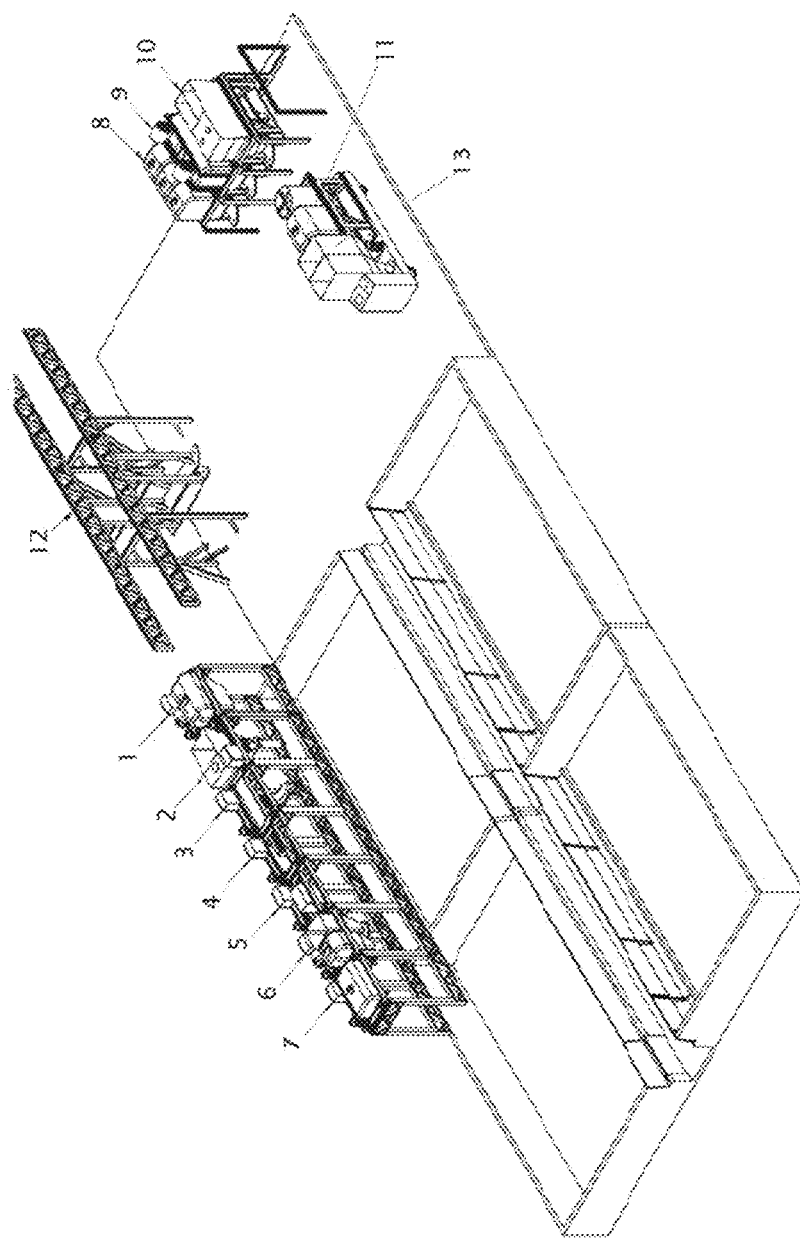
Figure 7:
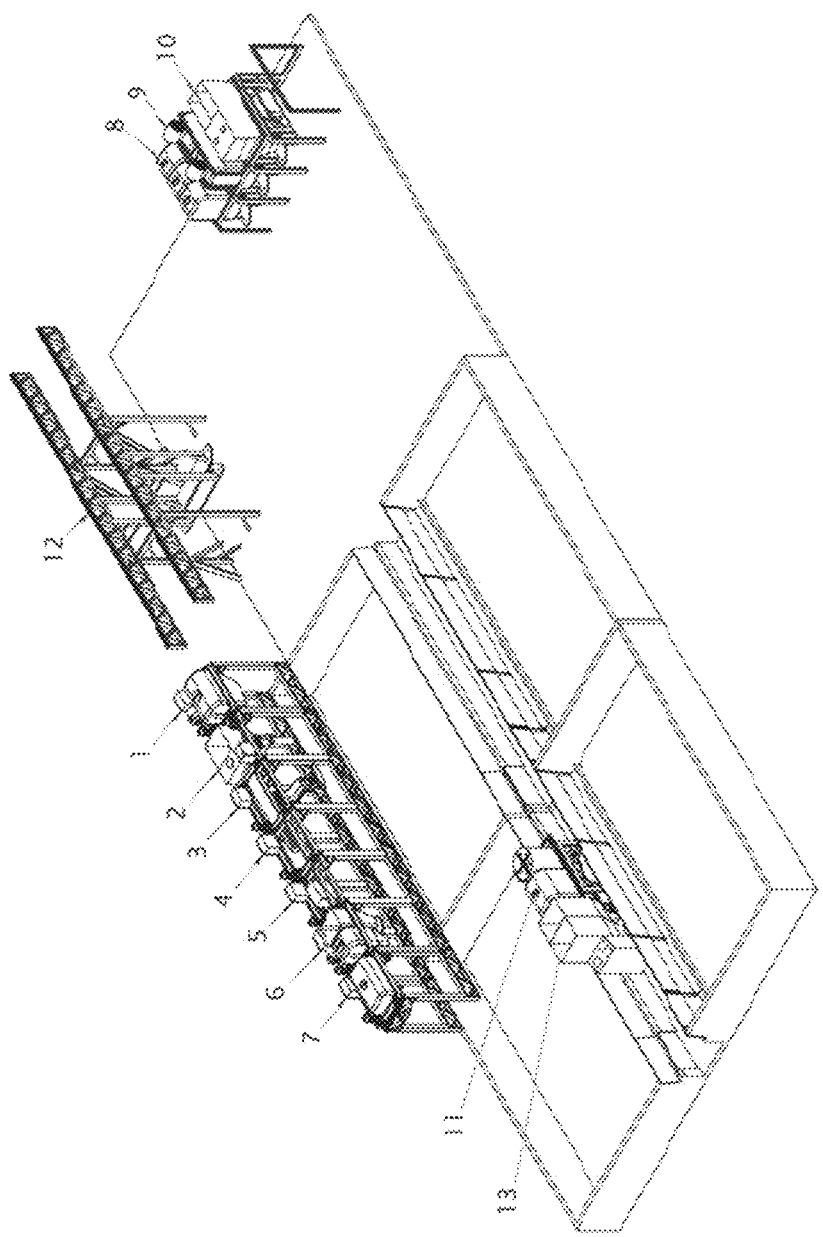
Figure 8:
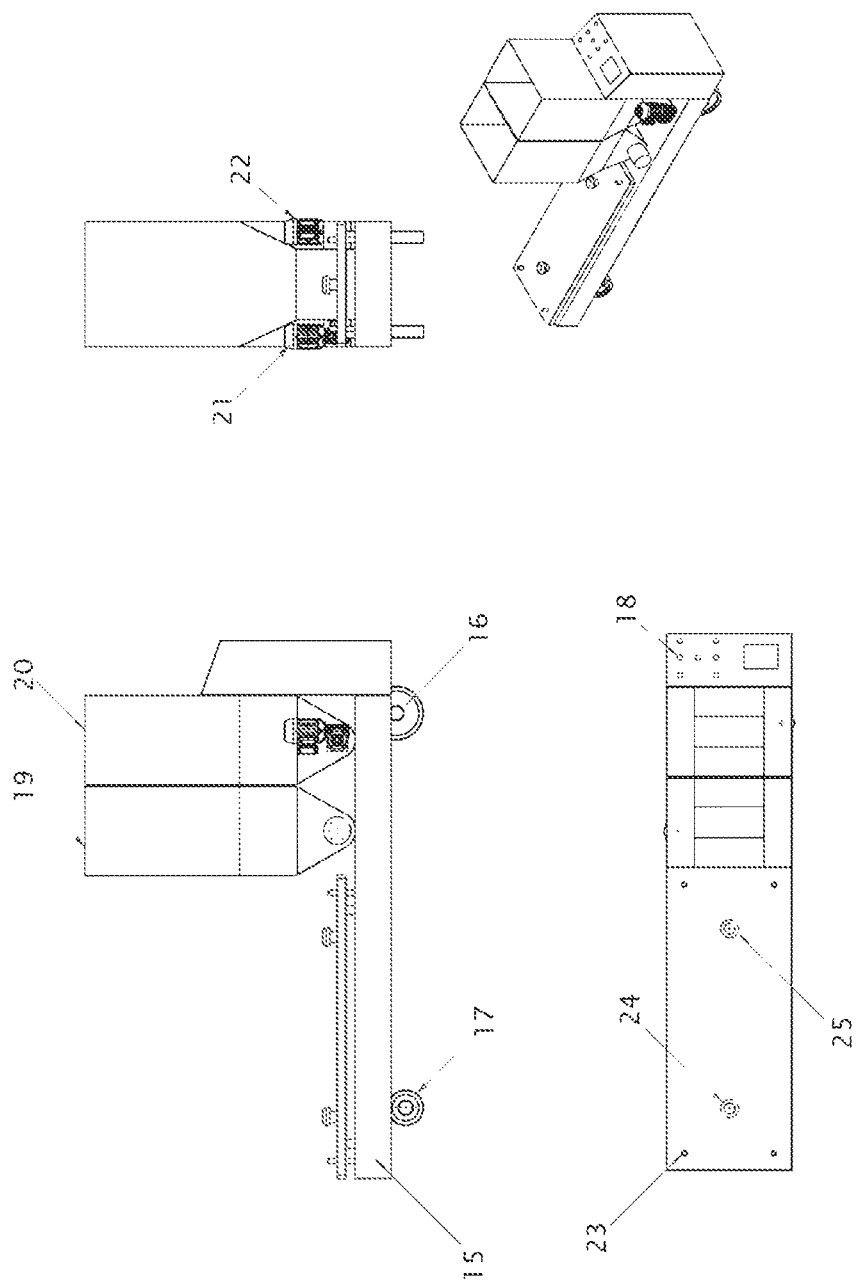
Figure 9:
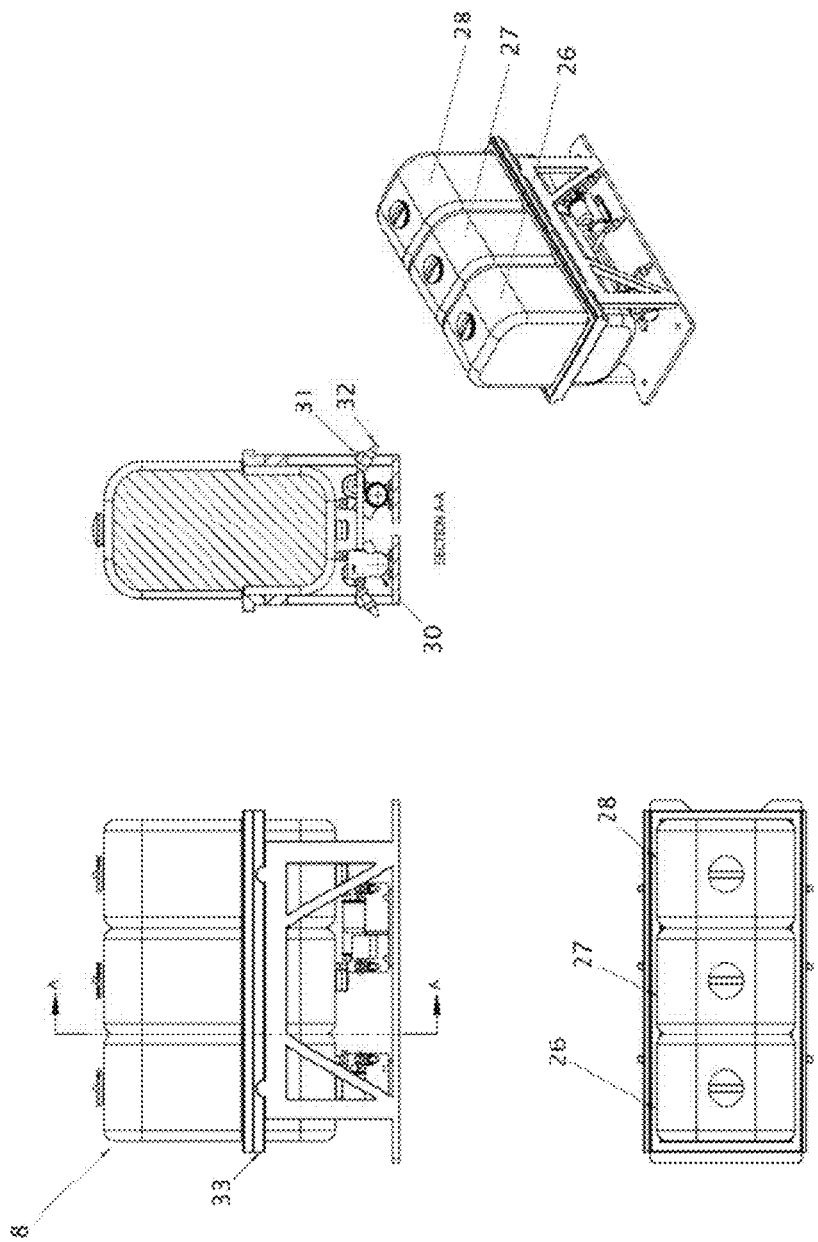
Figure 10:
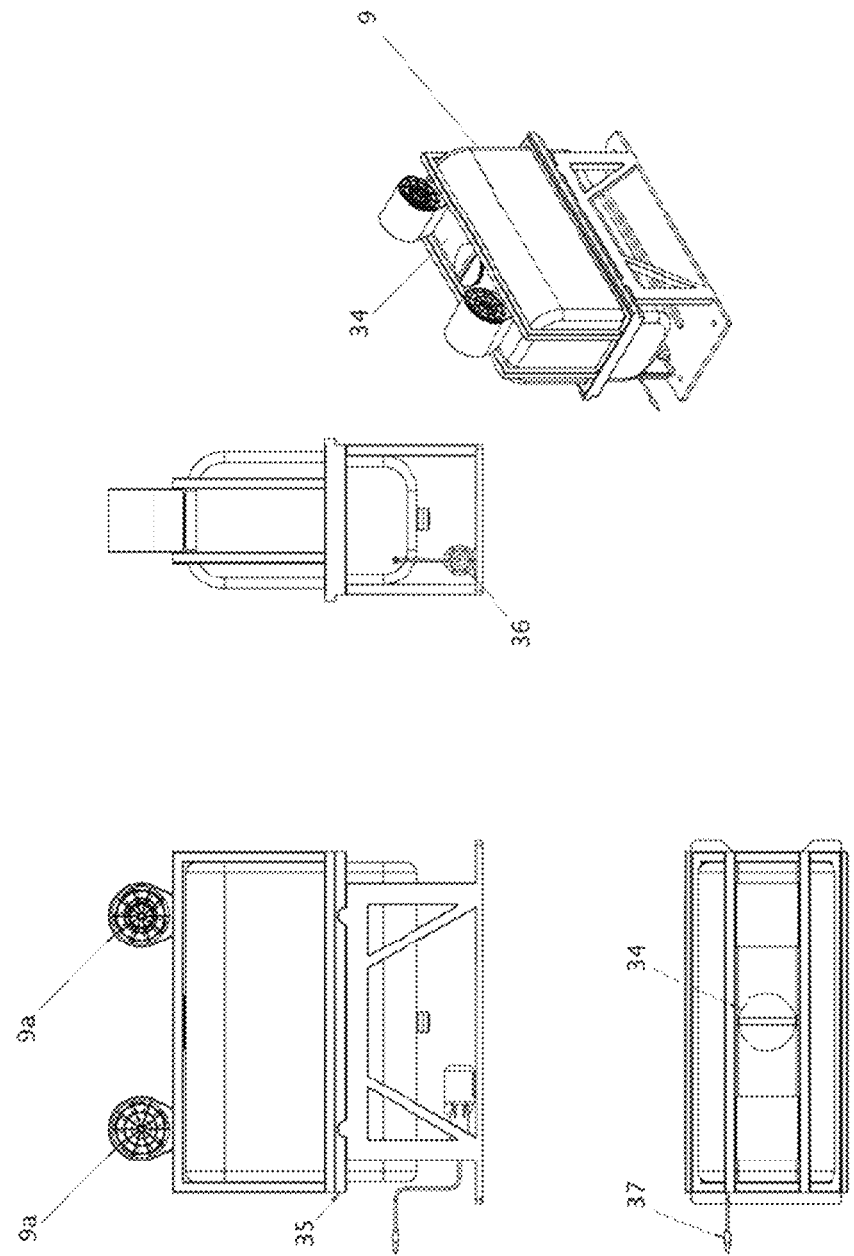
Figure 11:
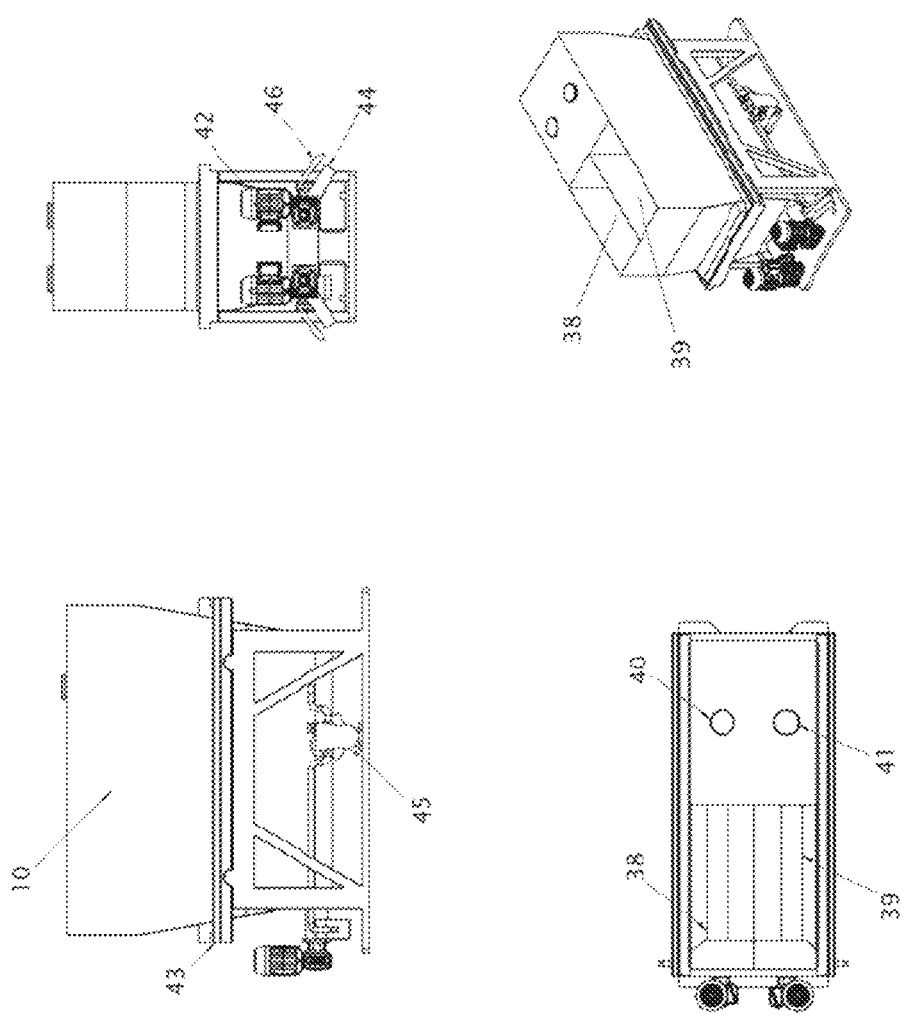

In this case, we have the following:

FIG. 1 shows an overview of the overhead magazine, land magazine, "T" structure, and multitasking land robot in the chassis coupling position;

FIG. 2 shows an overview and orthogonal view of the "T" structure;

FIG. 3 shows an overview of the overhead magazine, land magazine, "T" structure, and multitasking land robot already coupled to the structure and running through the functional aisle between the stalls;

FIG. 4 shows an overview of the overhead magazine, land magazine, "T" structure, and multitasking land robot already coupled to the structure and picking up and implement from the overhead magazine;

FIG. 5 shows an overview of the overhead magazine, land magazine, "T" structure, and multitasking land robot picking up items from the land magazine;

FIG. 6 shows an overview of the overhead magazine, land magazine, overhead "T" structure, and multitasking land robot loaded with an implement from the overhead magazine;

FIG. 7 shows an overview of the overhead magazine, land magazine, overhead "T" structure, and multitasking land robot already coupled and loaded with an implement from the land magazine, running through the functional aisle between the stalls;

FIG. 8 shows an overview and orthogonal view of the multitasking land robot;

FIG. 9 shows an overview, section view, and orthogonal view of the liquid dispenser;

FIG. 10 shows an overview and orthogonal view of the environment/animal sanitizer;

FIG. 11 shows an overview and orthogonal view of the multi-feed and liquid dispenser; and FIG. 12 shows an overview and orthogonal view of the liquid diet dispenser.

The system includes a waste picker (1), liquid and feed dispenser (2), user operational carrier (3), general carrier (4), data collector (5), overlay bed spreader/picker (6), and multifunction arm (7).

The land multitasking robot (13) consists of a self-propelled autonomous vehicle, provided with a support chassis (15) with drive wheel (16) activated by means of an electric motor and guide wheels (17), controlled by means of a command electrical panel (18) containing two feed containers (19 and 20) with a rotating screw distribution mechanism powered by gear motors (21 and 22), and said land multitasking robot (13) must be provided with coupling latches (23) and pins (24 and 25) to attach to the "T" shaped structure (12), being able to transport it through the maneuver area (Am) and existing functional aisles (Cf) between the several stalls (29) and couple to the overhead magazine (Ma). The land multitasking robot (13) is also able to couple to the several implements, for example, (8, 9, 10 and 11), existing in the land magazine (Mt).

The liquid dispenser (8) is assembled on a chassis (33) and counts on tanks (26, 27, and 28) able to store several types of liquids to be distributed in the stalls (29). The liquids are distributed by motor pumps (30) (45) and automated metering valves that allow dispensing pure or mixed liquids according to the schedule through the output nozzles (46). The tanks are equipped with a system to control the temperature as required by the breeding program. The tanks also count on shakers to homogenize the mix as required. This system is provided with level controllers that, in combination with automation, automatically supply the tanks.

The environment/animal sanitizer (9) is provided with cooling units (9a) assembled on the liquid tank (34) supported by the chassis (35), with a motor pump (36) and jet spray nozzle (37) system that cleans and disinfects the environment and the animals, using the appropriate liquid solutions for each application. The system is equipped with a heater to keep the solutions at the appropriate temperature. This implement counts on a cooling unit that sprays water at a controlled temperature to maintain a pleasant environmental temperature for the animals.

The multi-feed and liquid dispenser (10) consists of silos that include the feed tanks (38 and 39) and liquid tanks (40 and 41) that hold different types of feeds and liquids. The purpose of this system is to supply the stalls (29) with feed and liquids, duly dosed according to the schedule desired.

For feeds without good flow, the shaking system assembled in the feed tanks (38 and 39) allows better homogenization and avoids discontinuity of supply of worm gears to allow uniform distribution.

The silos are supplied by the primary line (worm gears inside the pipes), which carry the feed from the main silo to the multitasking mobile robot (13). This primary line is controlled by the sensors installed on the robot, connected to the sensor installed in the primary line motor. The quantity desired is controlled by the robot automation system.

The product is distributed by means of worm gears driven by independent gear motors (42), and the worm gears are assembled at the bottom of the feed tanks (38 and 39) with a system (Z axis) that allows approaching the troughs, with the feed supplied from the channels (44).

The worm gears are controlled by automation (sensors, drivers, MMIs, PLCs, load cells, etc.) that allows total control of the feed distributed to the stalls according to the quantity scheduled.

The quantity distributed is monitored by means of the load cells installed under the feed tank, in combination with the worm gear sensors.

This system is provided with level controllers that, in combination with automation, automatically supply the tanks.

The liquids are distributed by a motor pump (45) and automated metering valves that allow dispensing pure or mixed liquids according to the schedule through the output nozzles (46).

The liquid diet dispenser (11) consists of silos for several types of feeds, including a mixing tank (47) and a tank with different liquids and additives (48), both assembled on a chassis (49) with one motor pump (50) for the mixing tank (47) and one motor pump (51) for the tank (48); the purpose of the liquid diet dispenser (11) is to mix the ingredients to elaborate a diet rich in liquids, supplied to the troughs (29) by means of the liquid diet output nozzles (52). The metering valves and shakers mix an homogenize the ingredients to create the recipe desired, distributing the feed to the stalls according to the program. The system allows changing stall recipes during operations, according to the programmed feeding curves.

The structure (12) consists of a base (53) containing a central slot (54) to guide the pins (24 and 25), and the base (53) shall include holes (53a) to receive the coupling latches (23) and pairs of protruding columns (55 and 56) to support the trusses (57 and 58). This structure (12) has a support consisting of two metal frames (59 and 60) that allows the structure (12) to be vertical.

The multitasking robot (13) supplies the stalls with feed and carries all land and overhead implements through the shed, and contains all intelligence, automation, software, etc. The purpose is to manage and execute the tasks scheduled for each implement.

The invention claimed is:

1. A multitasking mobile robot system configured to distribute products and supplies and to perform animal breeding handling activities, comprising:
   a self-propelled autonomous vehicle having a support chassis comprising a drive wheel activated by means of an electric motor and guide wheels the autonomous vehicle having a command electrical panel for control, and the autonomous vehicle containing two feed containers with a rotating screw distribution mechanism powered by gear motors,
   wherein the autonomous vehicle has coupling latches and pins; and
   a T-shaped structure having a base containing a central slot to guide the pins of the autonomous vehicle when coupled to the autonomous vehicle, wherein the base has holes to receive the coupling latches of the autonomous vehicle when coupled to the autonomous vehicle, wherein said T-shaped structure has pairs of protruding columns that support trusses.

2. The multitasking mobile robot system, according to claim 1 wherein the autonomous vehicle is configured to couple to the T-shaped structure and transports the T-shaped structure through a maneuver area and functional aisle between a plurality of stalls.

3. The multitasking mobile robot system according to claim 2 wherein the T-shaped structure includes two metal frames that form a support for holding the structure vertically.

4. The multitasking mobile robot system, according to claim 2 further including an overhead magazine having overhead implements, wherein the autonomous vehicle moves the T-shaped structure through the functional aisle, in order to couple the trusses to the overhead magazine and displace the overhead implements through the trusses and distribute in the plurality of stalls.

5. The multitasking mobile robot system, according to claim 4 further including a land magazine having land implements, wherein the autonomous vehicle can couple to the land implements in the land magazine.

6. The multitasking mobile robot system, according to claim 5 wherein the autonomous vehicle can couple to the T-shaped structure to access the overhead magazine and the overhead implements or couple directly to the land implements.

7. The multitasking mobile robot system according to claim 6 wherein said land implements present in the land magazine are selected from a group consisting of a liquid dispenser, an environment/animal sanitizer, a multi-feed and liquid dispenser, and a liquid diet dispenser.

8. The multitasking mobile robot system according to claim 7 wherein the liquid dispenser is assembled on a chassis, with tanks to store several types of liquids to be distributed in the plurality of stalls, with the liquids being supplied by automated motor pumps, metering valves, and nozzles;
  wherein the environment/animal sanitizer is provided with cooling units assembled on the tanks supported by the chassis, with a motor pump and a jet spray nozzle system;
  wherein the multi-feed and liquid dispenser consists of silos with feed containers and liquid tanks assembled on a chassis; and
  wherein the liquid diet dispenser consists of silos for several types of feed,
  wherein the liquid diet dispenser includes a mixer tank and a tank with several liquids and additives, both assembled on a chassis with a motor pump for the mixer tank, and one motor pump for the tank, wherein a liquid diet is distributed to the plurality of stalls by means of an output nozzle.

\* \* \* \* \*